No. 802,008. PATENTED OCT. 17, 1905.
J. R. MARKLE.
LUBRICATOR.
APPLICATION FILED JULY 26, 1904.
2 SHEETS—SHEET 1.
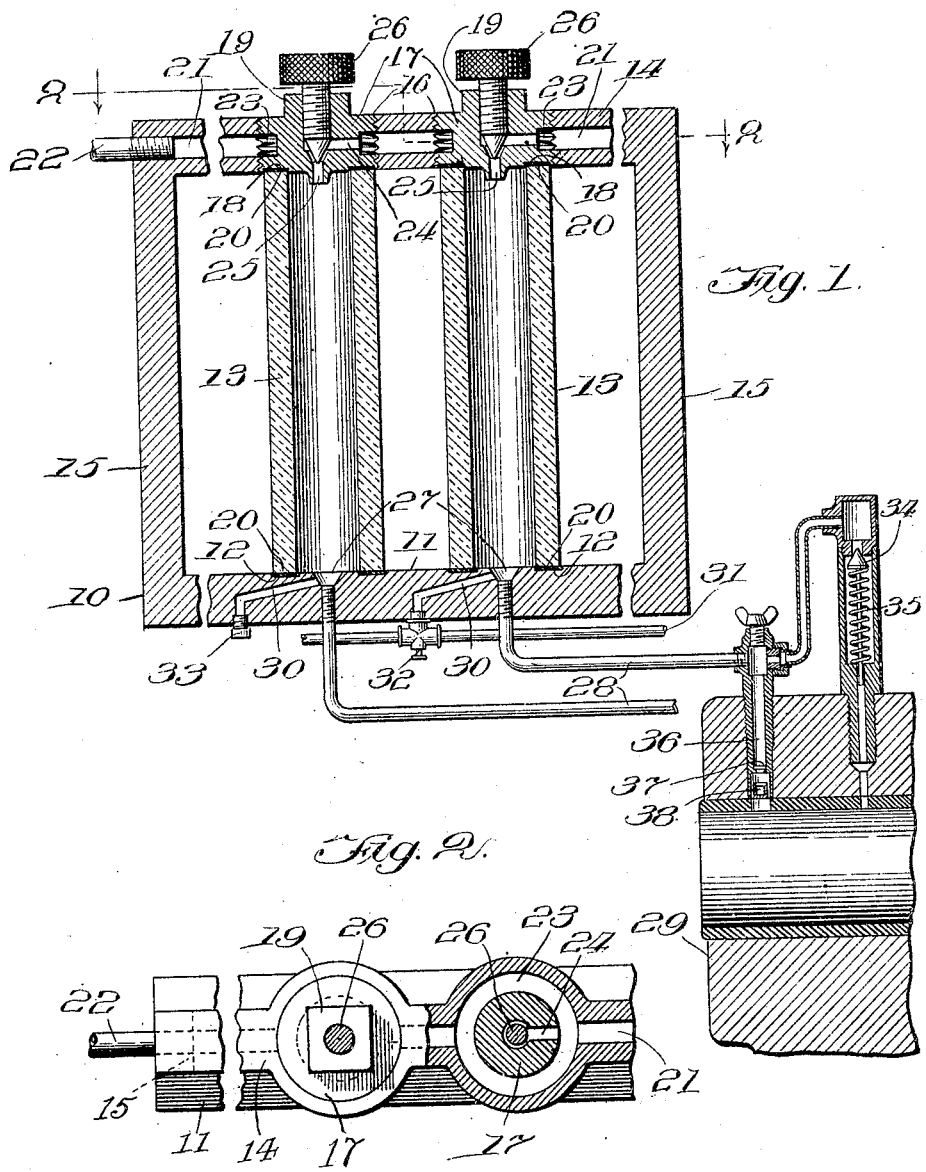
Witnesses:
H. S. Gaither
Chas. B. Gilson.
Inventor:
John R. Markle
by Louis R. Gibson
Attorney.

No. 802,008. PATENTED OCT. 17, 1905.
J. R. MARKLE.
LUBRICATOR.
APPLICATION FILED JULY 26, 1904.
2 SHEETS—SHEET 2.
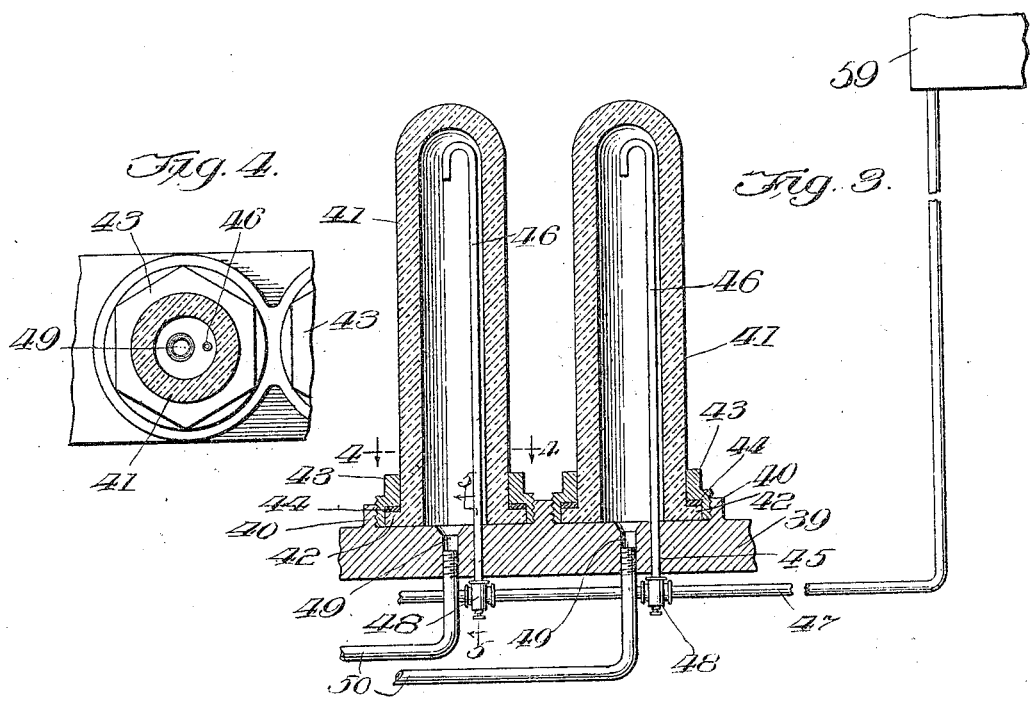
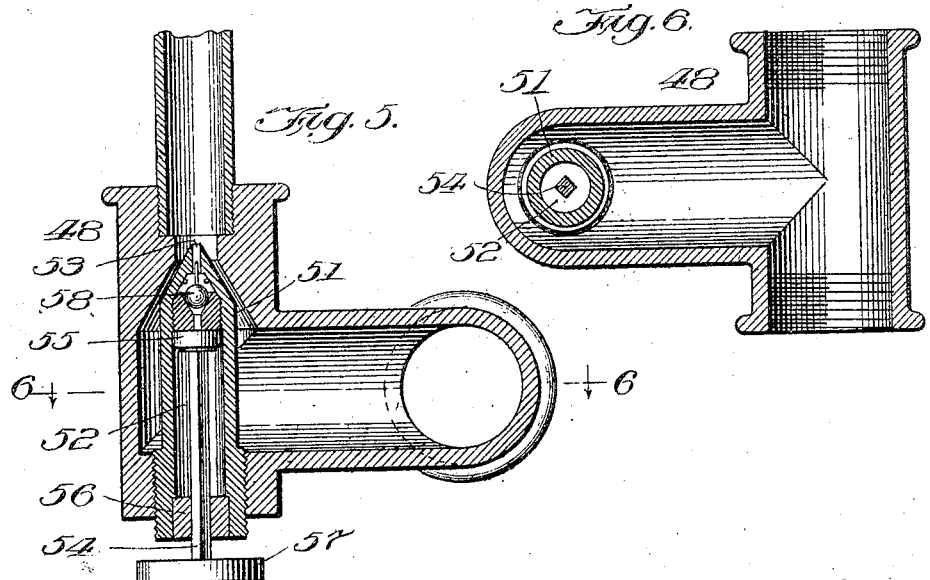
Witnesses:
H. S. Gaither
Chas. B. Gillson.
Inventor:
John R. Markle.
by Louis K. Gierson
Attorney

UNITED STATES PATENT OFFICE.

JOHN R. MARKLE, OF CHICAGO, ILLINOIS.

LUBRICATOR.

No. 802,008. Specification of Letters Patent. Patented Oct. 17, 1905.

Application filed July 26, 1904. Serial No. 218,264.

*To all whom it may concern:*

Be it known that I, JOHN R. MARKLE, a citizen of the United States, and a resident of Chicago, county of Cook, and State of Illinois, have invented certain new and useful Improvements in Lubricators, of which the following is a specification, and which are illustrated in the accompanying drawings, forming a part thereof.

This invention relates generally to a device for supplying a fluid lubricant continuously to a bearing or engine-cylinder, and more particularly to a device of the kind known as a "sight-feed lubricator."

The invention also contemplates the provision of means for indicating the condition of the bearing and the exhaustion of the supply of lubricant.

The invention is designed to be used in connection with any source of supply in which the lubricant is delivered to it under pressure, whether the pressure be obtained by means of gravity, compressed air, or any variety of pump being entirely immaterial.

More specifically, the invention relates to a lubricator in which the lubricant is allowed to pass through an inclosure containing air under pressure, the walls of the inclosure being preferably of glass, so that the rate of flow may be observed, and the amount of air in the inclosure being so regulated that under normal conditions of working the lubricant will fill the connections between the lubricator and the bearing and partially fill the glass inclosure. The pressure of air in the inclosure will be dependent upon the nature of the passage into the bearing, and as this passage will preferably be controlled by means of a spring check-valve or gravity-valve it will be of necessity great enough to open this valve, but will always be less than the pressure at which the lubricant is supplied.

The object of the present invention is to provide a lubricator which shall be of simple construction, not liable to develop leaky connections, and in which the rate of flow of the lubricant may be readily observed at all times and which will indicate by the height of the column of lubricant in a glass tube the condition of the bearing or the exhaustion of the supply of lubricant.

Differently stated, the object of this invention is to provide a lubricating device having the utilities of a hot-bearing indicator described in Letters Patent No. 731,801, issued to me June 23, 1903, and the advantages of a sight-feed.

These objects are accomplished in the construction and arrangement of parts to be hereinafter described and which are illustrated in the accompanying drawings, in which—

Figure 1 is a central vertical section of my improved lubricator, showing details of a bearing to which it is connected, some of the parts appearing in elevation. Fig. 2 is a plan of the lubricator, partly in section, viewed on the line 2 2 of Fig. 1. Fig. 3 is a central vertical section of a modified form of construction of my invention. Fig. 4 is a plan section on the line 4 4 of Fig. 3. Fig. 5 is a sectional view on the line 5 5 of Fig. 3, and Fig. 6 is a sectional view on the line 6 6 of Fig. 5. Figs. 5 and 6 are drawn to a very much larger scale than Figs. 1, 2, 3, and 4.

A casing or framework for containing the device, preferably made of brass, is shown at 10. This consists of a base-plate 11, which is provided with an annular recess 12, intended to receive the lower end of a glass tube or sight-glass 13, and a top plate 14, connected to the base-plate 11 by one or more uprights, as 15. The top plate is provided with an aperture 16 of sufficient diameter to permit of the insertion of the sight-glass 13 through it and having its walls threaded to receive a screw-plug 17, the under face of which is recessed at 18 to fit over the upper end of the sight-glass. The annular recesses 12 and 18 are lined with such packing 20 as may be required to prevent leakage at these joints. The upper face of the plug is provided with a shank 19 of suitable shape to receive a wrench by means of which the plug may be screwed to its seat. The top plate is also provided with a central longitudinal passage 21, communicating with a supply of lubricant under pressure, as indicated at 22, and is crossed by the vertical aperture 16, and in order that the passage shall not be obstructed by the plug 17 a circumferential recess 23 is provided in the plug so disposed as to its thickness as to connect with the passage 21, thereby forming a by-pass around the plug. A duct 24 in the plug 17 extends radially inwardly from the circumferential recess 23 and communicates with a vertical passage 25, opening into the interior of the sight-glass 13 and controlled by a needle-valve 26.

The base-plate 11 is vertically apertured at 27, preferably in line with the axis of the sight-glass 13, the aperture being threaded to form a means of attaching thereto the tube 28, leading to the bearing 29. An inclined passage 30 is provided in the base-plate 11, opening into the interior of the sight-glass and intended either to be permanently connected with a supply of air under pressure, as indicated at 31, and controlled by a cock 32 or to be provided with a nipple, as shown at 33, to which may be attached a small air-pump when desired. A check-valve 34 is provided in the passage 28 and preferably located at or near the bearing 29, a spring 35 being employed to hold the valve 34 to its seat. A by-pass 36, connecting the passage 28 with the bearing 29, is also provided and is normally closed by means of a fusible plug 37, which will be melted in case the bearing becomes undesirably hot and falling into a cup 38 will open the by-pass, thereby allowing all the lubricant contained in the tube 27 and the sight-glass 13 to flow at once onto the bearing.

In use the operation of the device is as follows: The needle-valve 26 is opened until the flow of lubricant from the duct 24, as observed through the walls of the sight-glass, is in the judgment of the attendant sufficient to give ample lubrication to the bearing. The valve 26 will not usually, however, be opened so as to allow the lubricant to flow in a continuous stream, but merely in drops. The lubricant coming into the sight-glass will fill the tube 28 and its connections and fill the sight-glass itself until such time as it has so compressed the air therein contained that the pressure produced is sufficient to compress the spring 35, and so unseat the check-valve 34 and allow the lubricant to flow into the bearing. It is intended that such a pressure will have been obtained when the lubricant has reached a height in the sight-glass (preferably about midway of its ends) which will permit of convenient observation of any fluctuations in its level, and if the lubricant does not begin to flow into the bearing when this level has been reached the attendant may increase the volume of the air contained in the sight-glass by opening temporarily the air-cock 32 or by operating a small hand-pump attached to the nipple 33. The flow having been once established, the level of the column of lubricant in the sight-glass will remain constant under uniform conditions of working, except for a slight loss of the volume of air, due to incipient leaks or to the absorption of oxygen by the lubricant, and this loss will be made up by the attendant from time to time in either of the ways just described. If, however, the connection with the bearing should become clogged, the level of the lubricant in the sight-glass will rise, as will be readily understood, and, on the other hand, should the supply become exhausted the level will fall. Also if the bearing should become heated from any cause sufficiently to melt the fusible plug 37 the column of lubricant would entirely leave the sight-glass. In this way the level of the column of lubricant in the sight-glass will serve as an indication of the condition of the bearing, the source of supply, and the connection of the device with the bearing. I propose to employ a sufficient number of these sight-glasses, with their connections, just described, (in the drawings two such are shown combined,) within a single frame 10 to provide a connection 27 with each bearing or cylinder in a room or on a single machine, so that the attendant will be able to inform himself at a glance of the condition of all the bearings for which he is responsible.

In Figs. 3 and 4 of the drawings is illustrated a modified form of the device which possesses certain advantages as to construction, its operation, however, being identical with that already described. In this form a base-plate 39 is employed in lieu of the frame 10, it being provided with an annular shoulder 40, within which rests the flaring base 42 of a sight-glass 41, having its upper end entirely closed and which is secured to the base-plate 39 by means of a ring 43, having threaded engagement with the annular shoulder 40 and recessed on its interior surface to receive the base of the sight-glass and such packing 44 as may be necessary to form a tight joint. The base-plate is apertured at 45 to permit of the insertion of a branch 46 of a supply-pipe 47, (employed in place of the passage 21 of the construction shown in Fig. 1,) which leads into the interior of the sight-glass and is of gooseneck form, so as to deliver the lubricant downwardly along the axis of the sight-glass from near its top. The branch 46 has preferably a T connection with the supply-pipe 47 to permit of a continuation of the supply to other combinations of the device in case they are employed in multiple, and a needle-valve 48 is provided at the base of the branch 46 for regulating the flow of lubricant into the sight-glass. A vertical aperture 49 is also provided in the base-plate 39, preferably in line with the axis of the sight-glass, and in this aperture the tube 50, leading to the bearing, (which corresponds in every way with the tube 28, shown in Fig. 1,) is secured.

In Figs. 5 and 6 is illustrated a form of needle-valve which may be used to regulate the flow of lubricant into the device and also to force additional air into the sight-glass. It is shown as employed for such purpose in the modified construction illustrated in Fig. 3; but it is obvious it might also be employed without modification in place of the needle-valve 26. (Shown in Fig. 1.) The feature of novelty in this valve is the formation of a small air-pump in its shank 51. For this purpose the shank is provided with a cylindrical aperture 52 and a duct 53 of small diameter, leading from the aperture to the point of the valve. A plunger 54, provided at its inner end with a leather cup or valve 55, is designed to reciprocate in the cylindrical aperture like the plunger of a small bicycle-pump. This plunger is made square and reciprocates through a square opening in the plug 56 for closing the cylindrical aperture, so that the disk 57, by which the plunger may be grasped, may also be employed to rotate the needle-valve in adjusting the flow of lubricant. The duct 53, leading to the point of the valve, is provided with a ball or other form of check-valve 58 to stop the lubricant from flowing back into the pump. As shown in Figs. 3, 5, and 6, the pump formed in the needle-valve will deliver air to the base of the branch tube 46 and may be employed from time to time to keep up the volume of air in the sight-glass.

It will be understood from the preceding that either of the constructions described provides, first, a pneumatic sight-feed—*i. e.*, a flow of lubricant through a volume of air confined within transparent walls; second, an indicator showing by the fluctuation of the level of the lubricant in the sight-glass an out-of-order condition either at the bearing or at the source of supply of the lubricant; third, when employed in combination with a passage to the bearing having a by-pass normally closed by a plug of fusible alloy an indicator showing overheating of the part lubricated from any cause, and, fourth, an indicator showing the existence of a fire about the machinery or system of piping, for the lubricant if heated by a fire would melt the fusible plug at the nearest bearing and allow the lubricant to flow out of the sight-glass through which that bearing was being lubricated. The empty sight-glass would attract the notice of the attendant to the bearing and he would discover the fire.

In Fig. 3 of the drawings a source of supply of lubricant under pressure is indicated by the elevated container 59. In this case the pressure will be the head obtained in the fall through the pipe 47.

I claim—

1. In a lubricator, in combination, a closed transparent reservoir, means for delivering lubricant thereto under pressure, and a discharge-pipe leading therefrom and having an obstruction in its passage yielding in the direction of discharge.

2. In a lubricator, in combination, a closed transparent reservoir, means for delivering lubricant thereto under pressure, a discharge-pipe leading therefrom and having a yielding obstruction in its passage, and means for introducing air into the reservoir.

3. In a lubricator, in combination, a closed reservoir, a dropping-nipple entering the reservoir, means for supplying liquid under pressure to the nipple, and a discharge-pipe leading from the reservoir and having a yielding obstruction in its passage.

4. In a lubricator, in combination, a base-plate, a transparent inverted cup secured to the plate, an induction-tube entering the cup through the plate and having its inner end turned downward, a source of fluid under pressure connected with the induction-tube, and a discharge-tube leading from the reservoir through the plate and having a yielding obstruction in its passage.

5. In a lubricator, in combination, a base-plate, a transparent inverted cup secured to the plate, an induction-tube entering the cup through the plate and having its inner end turned downward, a source of fluid under pressure connected with the induction-tube, a discharge-tube leading from the reservoir through the plate and having a yielding obstruction in its passage, and means for introducing air into the cup.

6. In a lubricator, in combination, a closed reservoir, a dropping-nipple entering the reservoir, a needle-valve for controlling the nipple, means for supplying liquid under pressure to the nipple, and a discharge-pipe leading from the reservoir and having a yielding obstruction in its passage.

7. In a lubricator, in combination, a closed reservoir, a dropping-nipple entering the reservoir, a needle-valve for controlling the nipple, such valve being tubular, a pump-plunger fitted to the bore of the valve, means for supplying liquid under pressure to the nipple, and a discharge-pipe leading from the reservoir and having a yielding obstruction in its passage.

8. In a lubricator, in combination, a closed reservoir, a dropping-nipple entering the reservoir, a needle-valve for controlling the nipple, such valve being tubular and formed into an air-pump, means for supplying liquid under pressure to the nipple, and a discharge-pipe leading from the reservoir and having a yielding obstruction in its passage.

9. In a lubricator, in combination, a transparent reservoir, a dropping-nipple for delivering fluid to the reservoir from a source of pressure, a duct leading from the base of the reservoir, and means for maintaining a column of fluid within the transparent reservoir.

JOHN R. MARKLE.

Witnesses:
CHAS. B. GILLSON,
E. M. KLATCHER.